United States Patent [19]
Takitani et al.

[11] 4,439,541
[45] Mar. 27, 1984

[54] CATALYTIC COMPONENT FOR POLYMERIZATION OF α-OLEFIN AND METHOD FOR HOMO- OR CO-POLYMERIZATION OF α-OLEFIN

[75] Inventors: Masaru Takitani; Shizuo Tomiyasu; Keikichi Baba, all of Shinnanyo, Japan

[73] Assignee: Toyo Stauffer Chemical Co., Ltd., Tokyo, Japan

[21] Appl. No.: 386,584

[22] Filed: Jun. 9, 1982

[30] Foreign Application Priority Data

Jun. 11, 1981 [JP] Japan ................... 56-89860

[51] Int. Cl.³ .............................. C08F 4/64
[52] U.S. Cl. ................... 502/125; 502/128; 502/126; 502/127; 502/122; 502/123; 526/142; 526/125
[58] Field of Search ...................... 252/429 B

[56] References Cited

U.S. PATENT DOCUMENTS

| | | | |
|---|---|---|---|
| 3,094,568 | 6/1963 | Hay et al. | 252/429 B X |
| 4,115,319 | 9/1978 | Scata et al. | 252/429 B |
| 4,143,223 | 3/1979 | Toyota et al. | 252/429 B X |
| 4,220,554 | 9/1980 | Scata et al. | 252/429 B |
| 4,242,229 | 12/1980 | Fujuii et al. | 252/429 B |
| 4,252,670 | 2/1981 | Caunt et al. | 252/429 B |
| 4,329,252 | 5/1982 | Gavens et al. | 252/429 B |

FOREIGN PATENT DOCUMENTS 2033409A 5/1980 United Kingdom .

*Primary Examiner*—Patrick Garvin
*Attorney, Agent, or Firm*—Armstrong, Nikaido, Marmelstein & Kubovcik

[57] ABSTRACT

A catalytic component for polymerization of an α-olefin is prepared by allowing an organo-magnesium compound expressed by the generic formula of RMgX (wherein R represents a hydrocarbon group having 1 to 20 carbon atoms and X a halogen atom or a hydrocarbon group having 1 to 20 carbon atoms) to react with carbon tetrahalide in the presence of an electron donor compound to obtain a solid product; by treating the solid product with phenols at 90° to 180° C.; and by further treating the phenol treated solid with a halogenated titanium compound. Homo- or co-polymerization of an α-olefin is carried out in the presence of a catalyst composition consisting of the catalytic component thus prepared and an organo-aluminum compound.

1 Claim, No Drawings

CATALYTIC COMPONENT FOR POLYMERIZATION OF α-OLEFIN AND METHOD FOR HOMO- OR CO-POLYMERIZATION OF α-OLEFIN

BACKGROUND OF THE INVENTION

This invention relates to a Ziegler type carrier catalytic component for α-olefin polymerization or copolymerization which is of highly uniform particle diameter, of good fluidity and has a long durable, high degree of polymerizing activity (hereinafter will be called the catalytic component for short unless otherwise specified) and to a method of carrying out homo- or co-polymerization (hereinafter will be called (co-) polymerization) of an α-olefin in the presence of a catalytic composition consisting of the above stated catalytic component and an organo-aluminum compound.

More particularly, the invention relates to a catalytic component for α-olefin polymerization prepared through steps including (a) a step in which an organo-magnesium compound expressed by the generic formula of RMgX (wherein R represents a hydrocarbon group having 1 to 20 carbon atoms and X either a halogen atom or a hydrocarbon group having 1 to 20 carbon atoms) is allowed to react with carbon tetrahalide in the presence of an electron donor compound to obtain a solid product, (b) a step in which the solid product is treated with phenols at 90° to 180° C., and (c) another step in which the phenol treated product is treated further with a halogenated titanium compound. The invention also relates to a method for (co-) polymerization of an α-olefin which is carried out in the presence of a catalyst composition consisting of the catalytic component thus obtained and an organo-aluminum compound.

It is an important feature of the present invention that the polymer product is obtainable in accordance with the invention in large weight per unit weight of the catalytic component used, that is, the catalytic component according to the present invention has a high degree of polymerizing activity. Another important feature of the invention resides in that the insufficient bulk density which has been a shortcoming of the conventional carrier catalytic components of the Ziegler type can be substantially improved by the use of the catalytic component according to the invention. In addition to these important features, it is a further important feature of the invention that the polymer obtainable in accordance with the invention is of such a large particle size that the polymer product obviates the necessity of a pelletizing process. The polymer does not includes fine particles and is of uniform particle diameter. Besides, it is an advantage of the catalytic component according to the invention that use of the catalytic component permits polymerization of propylene at a high temperature which has hitherto been extremely difficult. Another advantage of the invented catalytic component resides in that the polymerizing activity of the catalytic component is highly durable.

Generally, the catalysts which have been used for the manufacture of α-olefin polymers are of the type known by the name of a Ziegler-Natta catalyst consisting of a transition metal belonging to the groups IV–VI of the periodic table and an organo-metallic compound of a metal belonging to the groups I–III of the periodic table.

Recently, there have been proposed some supported catalytic components using a halogenated magnesium compound as carrier and having a transition metal supported on the surface of the carrier. In most of these catalytic components, magnesium chloride or magnesium chloride which has undergone some surface treatment is employed as carrier and is arranged to support titanium tetrachloride on the surface thereof. Most of them thus belong to the Ziegler type. However, the catalytic component preparing method using magnesium chloride as starting material for a carrier necessitates a pulverization process for activation as well as pulverization of the magnesium chloride. Then, the pulverization process gives powdery magnesium chloride in a crushed state not only lacking uniformity of particle diameter but also containing a large amount of fine powder. This results in lack of uniformity of particle diameter of not only the catalytic component obtained by the use of the magnesium chloride but also a polymer obtained from the use of the catalytic component. The polymers that have been obtained from the use of such a catalytic component have been extremely inferior in morphology such as fluidity, etc. A polymer of such inferior morphology produces powdery dust during molding and working processes to lower the efficiency of such processes. To solve this problem, therefore, it has been a general practice to pelletize such polymers before use of them.

An α-olefin product that permits omission of the pelletizing process would permit reduction in size of an α-olefin polymer manufacturing plant, reduction in the cost of construction of the plant and further reduction in energy consumption required after the manufacture of the α-olefin polymer and before shipment thereof to the market. These merits then result in substantial reduction in the manufacturing cost of the α-olefin polymer product.

Meanwhile, many catalytic components of improved morphology also have recently been proposed. Typical examples of these proposals include: Japanese Patent Application Laid-Open No. 54-41985 which discloses a method wherein an oxygen containing magnesium compound is granulated into spherical particles, with the particle diameter of them then adjusted through a sieving process; after sieving, treatments are carried out with a transition metal compound, an electron donor compound and an organo-metallic compound one after another; and then the treated matter is again treated with a transition metal compound. Also included is Japanese Patent Application Laid-Open No. 55-58207 which discloses a method wherein a solid product obtained by allowing an organo-magnesium compound and silicon tetrachloride to react with each other is treated with alcohols and carboxylic acid esters and, after that, the treated matter is treated further with titanium tetrachloride.

However, catalytic components obtained in accordance with these prior art methods either have a low degree of durability of polymerizing activity with initial high polymerizing activity rapidly decreasing after the initial stage of polymerization or give a polymer product of insufficient bulk density. These shortcomings of the catalytic components of the prior art seem to have been preventing them from becoming acceptable for practical applications.

Another shortcoming of the prior art catalytic components of the Ziegler type resides in their insufficient polymerizing properties at high temperature. The higher the polymerizing activity of the catalytic component is, the greater the momentary calorific value will be in such a case. Therefore, it is almost impossible to prevent local over-heating, even if the temperature control over the whole inside of a reactor is possible. Therefore, a catalytic component of high polymerizing activity is required to be also capable of retaining its performance even when an α-olefin polymerization process is carried out at a high temperature.

Meanwhile, in an attempt to eliminate the above stated shortcomings of the prior art catalytic components of the Ziegler type which are arranged to support titanium, the present inventors have strenuously conducted studies and have come to complete the present invention.

SUMMARY OF THE INVENTION

It is an object of the present invention to provide a catalytic component which eliminates the above stated shortcomings of the prior art catalytic components and is prepared through essential steps including (a) a step in which an organo-magnesium compound expressed by the generic formula of RMgX (in which R represents a hydrocarbon group having 1 to 20 carbon atoms and X a halogen atom chosen out of chlorine, bromine and iodine or a hydrocarbon group having 1 to 20 carbon atoms) is allowed to react with carbon tetrahalide in the presence of an electron donor compound to obtain a solid product; (b) a step in which the solid product thus obtained is treated with phenols at a temperature between 90° and 180° C.; and (c) the solid treated with the phenol is treated further with a halogenated titanium compound.

It is another object of the invention to provide a method for (co-) polymerization of an α-olefin wherein the polymerization is carried out either in the presence of a catalyst composition consisting of the above stated catalytic component and an organo-aluminum compound or with use of a concomitant electron donor compound together with the above stated catalyst composition.

Essential conditions for the preparation of the catalytic component in accordance with the present invention include: The reaction of the organo-magnesium compound and carbon tetrahalide is carried out in the presence of an electron donor compound. The solid product obtained through this reaction is treated with phenols at 90° to 180° C. Then, the phenol treated product is treated further with a halogenated titanium compound. Advantages that result from the use of the catalytic component according to the invention for polymerization of an α-olefin are: The catalytic component has a high degree of polymerizing activity to give a great amount of a polymer product. The polymerization can be carried out at a high temperature. The polymerizing activity is long durable. The polymer product is in good particle conditions and has a high degree of bulk density. The polymer product does not require any pelletizing process before shipment to the market.

The objects, features and advantages of the invention will become apparent from the following detailed description thereof.

DETAILED DESCRIPTION OF THE INVENTION

The electron donor compound usable in accordance with the invention is a compound selected from the group consisting of organic acid esters, organicether compounds, polysiloxanes, thioethers, ketones and amines and is usable either singly or in the form of a mixture of two or more kinds of them.

Now taking aliphatic carboxylic acid esters and aromatic carboxylic acid esters as specific examples of the organic acid ester, the aliphatic carboxylic acid esters may be selected from the group consisting of a primary alkyl ester of saturated aliphatic acid such as methyl formate, ethyl acetate, n-amyl acetate, 2-ethylhexyl acetate, n-butyl formate, ethyl butyrate, ethyl valerate, etc.; an alkenyl ester of saturated aliphatic acid such as vinyl acetate, allyl acetate; etc.; a primary alkyl ester of unsaturated aliphatic acid such as methyl acrylate, methyl methacrylate, n-butyl crotonate, etc.; a polybasic carboxylic acid ester such as 2-ethylhexyl adipate, etc.; a lactone such as γ-butyro lactone, δ-valero lactone, etc.; the aromatic carboxylic acid esters may be selected from the group consisting of a primary alkyl ester of benzoic acid such as methyl benzoate, ethyl benzoate, n-propyl benzoate, n- or iso-butyl benzoate, n- or iso-amyl benzoate, n-hexyl benzoate, n-octyl benzoate, 2-ethylhexyl benzoate, etc.; a primary alkyl ester of toluic acid such as methyl toluate, ethyl toluate, n- or iso-butyl toluate, 2-ethylhexyl toluate, etc.; a primary alkyl ester of anisic acid such as methyl anisate, ethyl anisate, n-propyl anisate, etc.; a primary alkyl ester of naphthoic acid such as methyl naphthoate, n-propyl naphthoate, n-butyl naphthoate, 2-ethylhexyl naphthoate, etc.; and an aromatic lactone such as cumarin, phthalide, etc. Among these ester, it is preferable to use methyl benzoate, ethyl benzoate, methyl toluate, ethyl toluate, methyl anisate, ethyl anisate, methyl naphthoate or ethyl naphthoate.

The organic ether compound that can be used as electron donor in accordance with the invention is a compound having an ether bond expressed by the generic formula of $R^1OR^2$ (wherein $R^1$ and $R^2$ represent either the same or different hydrocarbon groups each having 1 to 15 carbon atoms) or a polyether having at least two of such ether bonds within the same molecule or a cyclic ether forming a ring within the ether molecule thereof. More specifically, the organic ether compound may be selected from the group consisting of an aliphatic ether such as ethylether, propylether, isopropylether, butylether, isobutylether, amylether, isoamylether, hexylether, octylether, decylether, isodecylether, methylpropylether, methylisopropylether, methylbutylether, methylisobutylether, methylamylether, methylisoamylether, methylhexylether, ethylpropylether, ethylisopropylether, ethylbutylether, ethylisobutylether, ethylamylether, ethylisoamylether, ethylhexylether, vinylether, allylether, methylallylether, ethylvinylether, ethylallylether, butylvinylether, etc.; an aromatic ether such as anisole, phenetole, butylphenylether, amylphenylether, methoxytoluene, benzylethylether, phenylether, benzylether, phenylbenzylether, naphthylether, veratrol, etc.; a cyclic ether such as propylene oxide, trimethylene oxide, epoxybutane, dioxane, trioxane, furan, methylfuran, tetrahydrofuran, tetrahydropyrane, cineole, etc.; and a polyether such as dimethoxyethane, diethoxyethane, dibutoxyethane, diethyleneglycoldimethylether, diethyleneglycoldiethylether, diethyleneglycoldibutylether, methylal, acetal, glycerolether, crownether, etc.

The polysiloxane usable as electron donor in accordance with the invention is either a siloxane polymer having a repeating unit expressed by the generic formula of

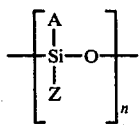

(wherein A and Z represent groups bondable to silicon, such as hydrogen, an alkyl group of carbon number 1 to 8, an aryl group of carbon number not exceeding 10, a halogen, an alkoxyl group of carbon number 1 to 8, an aryloxy group of carbon number not exceeding 10 or an aliphatic acid residual group of carbon number not exceeding 20; and n represents a number between 3 and 10000) or a siloxane polymer having two or more kinds of repeating units distributed in various ratios within the molecule thereof. More specifically, the polysiloxane may be selected from the group consisting of organopolysiloxanes including, for example, an alkylsiloxane polymer such as octamethyltrisiloxane, octaethylcyclotetrasiloxane, dimethylpolysiloxane, methylethylpolysiloxane, etc.; an arylsiloxane polymer such as hexaphenylcyclotrisiloxane, diphenylpolysiloxane, etc.; an alkarylsiloxane polymer such as diphenylhexamethyltetrasiloxane, methylphenylpolysiloxane, etc.; a haloalkylsiloxane such as 1,5-dichlorohexamethyltrisiloxane, 1,7-dichlorooctamethyltetrasiloxane, etc.; an alkoxysiloxane polymer such as dimethyloxypolysiloxane, diethoxypolysiloxane, etc.; and an aryloxysiloxane polymer such as diphenoxypolysiloxane, etc.

The thioether usable as electron donor compound in accordance with the present invention is a compound expressed by the generic formula of $R^3SR^4$ (wherein $R^3$ and $R^4$ respectively represent hydrocarbon groups of carbon number 1 to 20). Examples of such thioethers include diethylthioether, di-n-propylthioether, di-n-butylthioether, di-n-amylthioether, di-n-hexylthioether, di-n-octylthioether, di-n-decylthioether, methylphenylthioether, ethylphenylthioether, diphenylthioether, ditolylthioether, dibenzylthioether, diallylthioether, allylphenylthioether, etc.

The organic ketone usable as electron donor in accordance with the present invention is a compound expressed by the generic formula of $R^5COR^6$ (wherein $R^5$ and $R^6$ respectively represent hydrocarbon groups). The hydrocarbon group of the compound is, for example, an alkyl group of carbon number 1 to 15 such as methyl, ethyl, propyl, butyl, octyl, etc., or an aryl group of carbon number not exceeding 15, such as phenyl, tolyl, xylyl, etc., or an aralkyl group of carbon number not exceeding 15, such as benzyl. More specifically, the organic ketone may be selected from the group consisting of an aliphatic ketone such as acetone, methylethylketone, dibutylketone, dipentylketone, dioctylketone, etc.; and an aromatic ketone such as acetophenone, benzophenone, etc.

The amine usable as electron donor or accordance with the invention is a compound expressed by the generic formula of

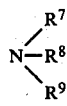

(wherein $R^7$ represents a hydrocarbon group and $R^8$ and $R^9$ respectively represent either hydrogen or hydrocarbon groups). Examples of such hydrocarbon groups of the amine include an alkyl group of carbon number 1 to 15 such as methyl, ethyl, propyl, butyl, octyl, etc.; and aryl group of carbon number not exceeding 15 such as phenyl, tolyl, xylyl, etc.; and an aralkyl group of carbon number not exceeding 15 such as benzyl. More specifically, the amine may be selected from the group consisting of an aliphatic primary, secondary or tertiary amine such as diethylamine, triethylamine, n-propylamine, di-n-propylamine, tri-n-propylamine, n-butylamine, di-n-butylamine, tri-n-butylamine, n-octylamine, di-n-octylamine, tri-n-octylamine, etc.; and an aromatic primary, secondary or tertiary amine such as aniline, N-methylaniline, N,N-dimethylaniline, diphenylamine, triphenylamine, N,N-dimethylbenzylamine, etc. In addition to these amines, a compound having at least two nitrogen atoms of amine in the molecule thereof, such as tetramethylmethylenediamine, ethylenediamine, tetramethylethylenediamine, tetraethylethylenediamine, etc. is also usable for the purpose of the invention.

The quantity in which the electron donor compound is to be used varies with the kind of the electron donor compound. Generally, however, the electron donor compound is used in quantity at least 0.001 mol against 1 mol of the organo-magnesium compound, preferably more than 0.01 and more preferably 0.1 or more. Use of the electron donor compound in quantity less than 0.001 mol results in low polymer productivity of the catalytic component and thus hardly gives any acceptable catalytic component. Although there is no particular upper limit to the quantity of the electron donor, use of more than 20 mol of it does not give any salient increase in the effect attainable. It is, therefore, preferable to use the electron donor in quantity not exceeding 20 mol.

It is preferable that the electron donor compound is allowed to react with the organo-magnesium compound, either by adding it to a solvent in which the organo-magnesium compound is dissolved or by diluting it with a solvent after the organo-magnesium compound is dissolved in the electron donor, before the organo-magnesium compound is mixed with carbon tetrahalide.

The organo-magnesium compound usable in accordance with the invention is expressed by the generic formula of RMgX (wherein R represent a hydrocarbon group having 1 to 20 carbon atoms and X a halogen atom chosen out of chlorine, bromine and iodine or a hydrocarbon group having 1 to 20 carbon atoms). More specifically, the organo-magnesium compound may be selected from the group consisting of diethylmagnesium, di-n-propylmagnesium, di-isopropylmagnesium, di-isoamylmagnesium, isoamylethylmagnesium, n-amyl-n-propylmagnesium, di-n-amylmagnesium, n-amyl-n-propylmagnesium, n-butyl-t-butylmagnesium, n-butylpropylmagnesium, dibutenylmagnesium, di-n-butylmagnesium, n-butylethylmagnesium, n-butyl-sec-butylmagnesium, di-t-butylmagnesium, di-sec-butylmagnesium, di-cyclopentadienylmagnesium, diphenylmagnesium, di-n-hexylmagnesium, n-hexylethylmagnesium, bis(methylcyclopentadienyl) magnesium, dihexynylmagnesium, dicyclohexylmagnesium, dibenzylmagnesium, bis(phenylethyl) magnesium, dicinamylmagnesium, n-octylethylmagnesium, di-n-octylmagnesium, di-n-decylmagnesium, methylmagnesium chloride, methylmagnesium bromide, methylmagnesium iodide, ethynylenemagnesium bromide, vinylmagnesium chloride, vinylmagnesium bromide, ethylmagnesium chloride, ethylmagnesium bromide, ethylmagnesium iodide, allylmagnesium chloride, propenylmagnesium bromide, isopropenylmagnesium bromide, n-propylmagnesium chloride, n-propylmagnesium bromide, isopropylmagnesium chloride, isopropylmagnesium bromide, 1-methylpropenylmagnesium bromide, tetramethyenemagnesium dibromide, t-butylmagnesium chloride, sec-butylmagnesium chloride, cyclopentadienylmagnesium chloride, cyclopentadienylmagnesium bromide, p-phenylenemagnesium dibromide, phenylmagnesium chloride, phenylmagnesium bromide, styrylmagnesium chloride, styrylmagnesium bromide, 1-methyl-2,2-diphenylcyclopropylmagnesium bromide, amylmagnesium chloride, hexylmagnesium chloride, benzylmagnesium chloride, octylmagnesium chloride, decylmagnesium chloride, etc. Among these organo-magnesium compounds, use of n-butylethylmagnesium, n-hexylethylmagnesium, di-n-hexylmagnesium, n-octylethylmagnesium, di-n-butylmagnesium, di-n-octylmagnesium, ethylmagnesium chloride, n-butylmagnesium chloride, n-hexylmagnesium chloride or n-octylmagnesium chloride is preferable in respect to ease of use.

In accordance with the invention, the organo-magnesium compound is used in the form of a solution and is rendered soluble by a solvent selected from the group consisting of an aliphatic hydrocarbon such as hexane, heptane, kerosine, etc.; an alicyclic hydrocarbon such as cyclohexane, methylcyclohexane, etc.; an aromatic hydrocarbon such as benzene, toluene, xylene, etc.; one of the above mentioned organic ether compounds; one of the above mentioned amines; and a mixture of them.

The concentration of the organo-magnesium compound in the solvent varies with the structure, the number of carbon atoms and the kind of the halogen atom of R and X shown in the generic formula RMgX of the organo-magnesium compound. However, the concentration does not exceed 50 wt % and preferably less than 45 wt %. The organo-magnesium compound is generally viscous. Therefore, the concentration thereof exceeding 50 wt % causes the solvent in which it is dissolved to because too viscous for easy operations such as stirring, etc. There is no specific lower limit to the concentration. However, with the productivity of the catalytic component taken into consideration, the concentration of the organo-magnesium compound is preferably at least 0.1 wt %.

The carbon tetrahalide to be used in accordance with the invention may be selected from the group consisting of carbon tetrafluoride, carbon tetrabromide, carbon tetrachloride and carbon tetraiodide. However, in respect of economy, ease of handling and catalytic properties, it is preferable to use carbon tetrachloride.

The carbon tetrahalide is used for the purpose of replacing the hydrocarbon group of the organo-magnesium compound with halogen atoms. The quantity of the carbon tetrahalide to be used is 0.01 to 10 mol per mol of the hydrocarbon group of the organo-magnesium compound, preferably 0.05 to 5 mol and more preferably 0.1 to 3 mol.

In accordance with the invention, the organo-magnesium compound and the carbon tetrahalide are mixed and allowed to react with each other in the presence of the electron donor compound. In effecting this mixing, the carbon tetrahalide may be added to a solution of the organo-magnesium, and vice versa, or the two may be simultaneously added together and mixed. However, since the organo-magnesium compound is generally viscous, though the viscosity varies with the kind and concentration of the organo-magnesium compound, it is preferable to have the carbon tetrahalide added to and mixed with a solvent in which the organo-magnesium compound has been dissolved, with the carbon tetrahalide either diluted with a hydrocarbon or not diluted before the addition. There is no particular limitation to the temperature at which the organo-magnesium compound and the carbon tetrahalide are allowed to react with each other in accordance with the invention. However, since the reaction vigorously takes place at high temperature, the reaction is preferably carried out at a relatively low temperature at which the reaction proceeds not too slowly. In view of this, the reaction temperature is set at a temperature between $-50°$ and $100°$ C. and preferably between $-25°$ and $60°$ C. To ensure that the reaction is completely carried out, it is preferable, though it depends on the reaction temperature, to have a stirring and mixing operation further continued, after completion of mixing of the carbon tetrahalide, over an additional period of 0.1 to 10 hours at the same temperature or with the temperature raised from the reaction temperature up to a temperature not exceeding 150° C.

A solid product obtained through this reaction is subjected to a solid-liquid separation process carried out by a suitable method such as decantation, filtration or centrifugal separation and is thus separated from the reaction system. The solid product thus separated is preferably washed with a hydrocarbon solvent selected from the group consisting of hexane, heptane, kerosine, cyclohexane, methyl cyclohexane, benzene, toluene, xylene, etc.

The phenol to be used in accordance with the invention is selected from the group consisting of phenol, cresol, xylenol, naphthol, butylhydroxytoluene, chlorophenol, bromophenol, 2,4,6-trichlorophenol, 2,4,6-tribromophenol, nitrophenol, 2,4-dinitrophenol, quaiacol, anol, eugenol, isoeugenol, saligenin, carvacrolthymol, hydroxyacetophenone, hydroxydiphenyl, cyclohexylphenol, catechol, resorcin, hydroquinone, pyrogallol, hydroxyhydroquinone, phloroglucinol, aminophenol, etc.

The quantity of the phenol to be used per mol of the magnesium contained in the solid product is 0.01 to 10 mol, preferably 0.05 to 5 mol and most preferably 0.1 to 3 mol. The effect brought about by the use of the phenol appears mainly in the polymerizing activity when the (co-) polymerization of an α-olefin is carried out with the catalytic component thus obtained. In the case of catalytic components that are prepared without the treatment with a phenol tend to have lower polymerizing activity.

The treatment of the solid product with the phenol is preferably carried out in one or more kinds of hydrocarbon solvent selected from the group consisting of an aliphatic hydrocarbon such as heptane, octane, decane, kerosine, etc.; an alicyclic hydrocarbon such as methyl cyclohexane, cycloheptane, decalin, etc.; and an aromatic hydrocarbon such as toluene, xylene; tetralin, etc.

This treatment is generally carried out in the following manner: The solid product is suspended in the hydrocarbon solvent and then the phenol is added either without diluting it or by diluting it with a hydrocarbon to an extent between 1 and 100 vol %.

The length of time required for the treatment to be carried out with the phenol varies with the treating temperature and the kind of the phenol used and thus not particularly limited. However, the preferred length of time for the treatment is between 0.1 and 10 hours. Treatment for a length of time less than 0.1 hour will not give any effect of the treatment. Conversely, treatment over a period of time exceeding 10 hours will not give any salient increase in the attainable effect. Meanwhile, the temperature at which the treatment with the phenol is to be carried out is an important factor in accordance with the invention and is set between 90° and 180° C. and preferably between 95° and 150° C. Treatment at a temperature below 90° C. tends to result in lower catalytic properties. However, treatment at a temperature above 180° C. does not give any salient increase in the attainable effect.

The solid product treated with the phenol in this manner (hereinafter will be called the phenol treated product) is then treated with a halogenated titanium compound in accordance with the invention. For this treatment, the phenol treated product may be treated with the halogenated titanium compound without any preparatory process. For further improvement in the catalytic properties such as polymerizing activity, however, the phenol treated product may be dried by heating under reduced pressure before the treatment is carried out with the halogenated titanium compound. Hereinafter, the solid product which has been thus dried by heating under reduced pressure will be called the dried product. The drying process on the phenol treated product is carried out at pressure not exceeding 500 mmHg in absolute pressure, at a temperature between 10° and 100° C., and over a period of 1 to 10 hours.

The halogenated titanium compound that is usable in accordance with the invention is a compound expressed by the generic formula of Ti $(OR^{10})_n X'_{4-n}$ (wherein $R^{10}$ represents a hydrocarbon group having 1 to 15 carbon atoms, X' a halogen atom chosen out of chlorine, bromine and iodine and n a real number of $0 \leq n \leq 3$) and may be selected from the group consisting of titanium tetrachloride, titanium tetrabromide, titanium tetraiodide, ethoxytitanium trichloride, propoxytitanium trichloride, butoxytitanium trichloride, dibutoxytitanium dichloride, tributoxytitanium monochloride, etc. The quantity of the halogenated titanium compound to be used against 1 mol of magnesium contained in the phenol treated product or in the dried product is at least 0.01 mol, preferably 1.0 or more and most preferably 10 mol or more. This treatment is normally carried out over a period of 10 minutes to 10 hours at a temperature between room temperature and 150° C. To carry out this treatment, known methods may be employed including, for example, a method in which the phenol treated product or the dried product is suspended in the halogenated titanium compound; and a method in which the phenol treated product or the dried product is suspended in a hydrocarbon solvent in which the halogenated titanium compound is dissolved. Anyway, it is preferable to arrange the concentration of the halogenated titanium compound to be as high as possible.

Further, in carrying out the treatment with the halogenated titanium compound, a known electron donor compound may be allowed to be concomitant.

After the treatment, a solid-liquid separation process is carried out either by decantation or filtration. The halogenated titanium compound, etc. sticking to the surface of the solid thus obtained are washed off with a hydrocarbon such as hexane, heptane, kerosine, cyclohexane, methyl cyclo-hexane, benzene, toluene, xylene, etc. A catalytic component is obtained either in a slurry like state in the hydrocarbon or in a dried state by carrying out a drying process. The catalytic component thus obtained is of uniform particle diameter and has good fluidity.

The catalytic component of the invention can be used for the (co-) polymerization of an α-olefin in combination with an organo-aluminum compound.

The organo-aluminum compound to be used for this purpose is a compound expressed by the generic formula of $AlR^{11}{}_l X^2{}_{3-l}$ (wherein $R^{11}$ represents a hydrocarbon group of carbon number 1 to 20; $X^2$ either a halogen atom chosen out of fluorine, chlorine, bromine and iodine or a hydrogen atom; and l a real number of $0 < l \leq 3$). More specifically, the organo-aluminum compound is selected from the group consisting of trimethylaluminum, triethylaluminum, tri-n-propylaluminum, tri-n-butylaluminum, tri-iso-butylaluminum, tri-n-hexylaluminum, tri-2-methylpentylaluminum, tri-n-octylaluminum, tri-n-decylaluminum, diethylaluminum chloride, di-n-propylaluminum chloride, di-isobutylaluminum chloride, methylaluminum sesquichloride, ethylaluminum sesquichloride, ethylaluminum dichloride, isobutylaluminum dichloride, diethylaluminum fluoride, diethylaluminum bromide, diethylaluminum iodide, diethylaluminum hydride, diisobutylaluminum hydride, isoprenylaluminum, etc. These organo-aluminum compounds are usable either singly of in a state of a mixture consisting of two or more kinds.

The addition quantity of the organo-aluminum compound per mol of the titanium contained in the catalytic component, as reduced to the mol number of aluminum contained in the organoaluminum compound, Al/Ti, is preferably between 1 and 1000.

For further improvement in the catalytic properties, etc., a known electron donor compound may be allowed to be concomitant in carrying out the polymerization. Such a known electron donor may be selected from those mentioned in the foregoing. The quantity of the electron donor compound to be used per mol of the organoaluminum compound for this purpose is 0.01 to 3 mol, preferably 0.05 to 2 mol and more preferably 0.1 to 1 mol.

The (co-) polymerization may be carried out by one of various processes including: A suspension polymerization process using a solvent which is selected from the group consisting of an aromatic hydrocarbon such as benzene, toluene, xylene, etc.; an aliphatic hydrocarbon such as hexane, heptane, octane, kerosine, etc.; and an alicyclic hydrocarbon such as cyclohexane, methylcyclohexane, etc. A liquid phase polymerization process using a liquefied α-olefin as solvent. A gas phase polymerization process in which an α-olefin is polymerized in a vapor phase. As for the mode of carrying out the (co-) polymerization, either a continuous mode or a batch mode may be employed.

The α-olefin that can be (co-) polymerized by using the invented catalytic component is an organic compound expressed by the generic formula of $CH_2=CHR^{12}$ (wherein $R^{12}$ represents either hydrogen or a hydrocarbon group having 1 to 6 carbon atoms). Such organic compounds include, for example, ethylene, propylene, butene-1, 4-methylpentene-1, hexene-1, styrene, etc. In the (co-) polymerization of these α-olefins, the molecular weight adjustment can be accomplished by a known method using hydrogen or diethylzinc.

The (co-) polymerization is carried out preferably at a temperature between 0° and 200° C. and preferably between 40° and 120° C. and under pressure between normal pressure and 100 atm and more preferably between normal pressure and 60 atm.

The polymer obtainable in accordance with the present invention is highly uniform in particle diameter, of high bulk density and excels in particle conditions. It can be marketed as it is without any pelletizing process. In the case of a propylene polymer, it does not necessitate a process for removal of any residual catalyst.

The invention will be more clearly understood from the following detailed description of examples, in which: symbols g-polymer/g-catalyst, g-polymer/mmol Ti-hr-atm, g-polymer/g-catalyst-hr-atm, H.I. (portion insoluble in heptane) and ρB (bulk density) used in these examples and particularly in tables are defined as shown below:

| | |
|---|---|
| g-polymer/g-catalyst: | Yield of polymer per g of the catalytic component. |
| g-polymer/mmol Ti-hr-atm: | Yield of polymer per unit time (hr), per unit pressure (atm) of α-olefin and per mmol of titanium. |
| g-polymer/g-catalyst-hr-atm: | Yield of polymer per unit time (hr), per unit pressure (atm) of α-olefin and per g of the catalytic component. |
| H.I.: | n-heptane insoluble polymer (g) × 100/polymer (g) |
| ρB: | Bulk density (g/ml) of polymer as measured in accordance with the Method A of ASTM-D-1895-69. |

EXAMPLE 1

1. Preparation of the Catalytic Component

Under a nitrogen atmosphere, 161 ml of an n-heptane solution of n-butylethyl magnesium (manufactured by Texas Alkyls Inc. of U.S.A., concentration 0.65 mol/liter) which was used as the organo-magnesium compound was put in a 300 ml flask equipped with a stirrer, a thermometer and a dropping funnel. The flask was then cooled down to 0° C. To this was added 2.0 ml of ethylbenzoate. Following the ethylbenzoate, a mixed solution consisting of 25 ml of carbon tetrachloride and 75 ml of n-heptane was dropped. After completion of the dropping process, the temperature of the flask was kept at 0° C. for 40 minutes, at room temperature for 40 minutes and then raised up to 80° C. to allow a reaction to proceed over a period of 60 minutes at 80° C. to obtain a solid product. The solid product was washed with 200 ml of n-heptane by carrying out decantation five times. After the washing process, 100 ml of kerosine was put into the flask and the solid product was suspended therein. To this suspension was added 5 g of p-cresol which had been diluted with 100 ml of kerosine. Temperature was then raised up to 100° C. and a reaction was allowed to proceed at that temperature over a period of 2 hours. A reaction product thus obtained was washed five times with 200 ml of n-heptane by carrying out decantation.

After washing, the solid product thus obtained was transfered, under a nitrogen atmosphere, to a 200 ml of flask which was equipped with a stirrer, a thermometer and a condenser. Then, 80 ml of titanium tetrachloride was added to the solid product. The flask was immersed in an oil bath the temperature of which was raised up to 140° C. Under this condition, a reaction was allowed to proceed over a period of 2 hours. A reaction product thus obtained was filtered and was washed with n-heptane until chlorine ion disappeared from the filtrate. A catalytic component was obtained through a drying process which was carried out under reduced pressure.

The catalytic component thus obtained consisted of very uniform particles measuring 40μ in average particle diameter.

2. Polymerization of Ethylene

Forty mg of the above stated catalytic component, 1.4 ml of triethylaluminum and 2.5 liters of n-heptane were put in a 5 liter autoclave which had the inside thereof replaced with dry nitrogen. The temperature of the autoclave was raised up to 80° C. Then, 4 kg/cm$^2$G of hydrogen and 4 kg/cm$^2$G of ethylene were supplied into the autoclave. Polymerization was carried out for 2 hours while ethylene was supplied to obtain total pressure of 8 kg/cm$^2$G. The solvent was separated and a drying process was carried out to obtain 510 g of polyethylene which was white and in a granular state of very narrow particle size distribution. The bulk density of the polyethylene was 0.40 g/ml. The yield of the polyethylene was 1.2750 g per g of the catalytic component. This is equivalent to 1,970 g PE/mmol Ti-hr-ethylene atm. These results are as shown in Table 1.

3. Polymerization of Propylene

Forty mg of the catalytic component, 0.5 ml of triethylaluminum, 0.1 ml of diethylaluminum chloride and 0.16 ml of ethyl p-anisate were put in a 5 liter autoclave the inside of which had been replaced with dry nitrogen. Following this, 0.4 kg/cm$^2$G of hydrogen and 1.5 kg of a propylene monomer were supplied into the autoclave. The propylene was polymerized over a period of 2 hours with the temperature of the autoclave kept at 80° C. By this, 1,098 g of granular polypropylene which was of very narrow particle size distribution was obtained. The yield of the polypropylene was 27,450 g per g of the catalytic component. The bulk density was 0.42 g/ml. The results of the polymerization were as shown in Table 2.

COMPARISON EXAMPLE 1

A catalytic component was prepared in exactly the same manner as in Example 1 with the exception of that the treatment with p-cresol which was carried out in Example 1 was omitted in this case.

Polymerization of Ethylene

Ethylene was polymerized in exactly the same manner as in Example 1 to obtain results as shown in Table 1.

Polymerization of Propylene

Propylene was polymerized in exactly the same manner as in Example 1 to obtain results as shown in Table 2.

COMPARISON EXAMPLE 2

A catalytic component was prepared in exactly the same manner as in Example 1 with the exception of that the treatment with p-cresol was carried out at 60° C. in this case.

Polymerization of Ethylene

Ethylene was polymerized in exactly the same manner as in Example 1 to obtain results as shown in Table 1.

Polymerization of Propylene

Propylene was polymerized in exactly the same manner as in Example 1 to obtain results as shown in Table 2.

EXAMPLE 2

The inside of a flask which was of capacity 500 ml and was equipped with a dropping funnel and a water cooling reflux condenser was replaced with dry nitrogen. Into this flask were put 14.6 g (0.6 mol) of metal magnesium powder of 100 to 200 mesh, 363 ml of n-heptane and small pieces of iodine. The temperature of the flask was raised up to 95° C. Following that, a mixture consisting of 0.5 mol of n-butylchloride and 0.5 mol of di-n-butylether was taken into the dropping funnel and, under a stirring operation and at 90° to 100° C., was dropped gradually over a period of 2 hours. After completion of dropping, stirring was further carried on at 90° to 100° C. over a period of 4 hours. Then, the stirring operation was stopped. A resultant supernatant was taken out within nitrogen. The liquid thus obtained was analyzed to find that this liquid was a heptane solution of an organomagnesium-butyl ether coordination compound and was of a structure expressed by n-BuMgCl. The organic metal concentration in this liquid was 0.73 mol/liter.

Then, 143 ml of the above mentioned n-butylmagnesium chloride-butylether coordination compound was employed as organo-magnesium compound for preparation of a catalytic component. With the exception of that, the catalytic component was prepared in exactly the same manner as in Example 1.

Polymerization of Ethylene

Ethylene was polymerized in exactly the same manner as in Example 1 to obtain results as shown in Table 1.

Polymerization of Propylene

Propylene was polymerized in exactly the same manner as in Example 1 to obtain results as shown in Table 2.

EXAMPLE 3

In the preparation of a catalytic component, 75 ml of the n-butylmagnesium chloride-di-n-butylether solution (concentration: 1.4 mol/liter) was used as the organomagnesium compound. With the exception of that, the catalytic component was prepared in exactly the same manner as in Example 1.

Polymerization of Ethylene

Ethylene was polymerized in exactly the same manner as in Example 1 to obtain results as shown in Table 1.

Polymerization of Propylene

Propylene was polymerized in exactly the same manner as in Example 1 to obtain results as shown in Table 2.

EXAMPLES 4 and 5

In each of Examples 4 and 5, a catalytic component was prepared in exactly the same manner as in Example 1 with the exception of that the p-cresol which was used as the phenol compound in Example 1 was replaced with compounds shown in Table 3.

Polymerization of Ethylene

Ethylene was polymerized in exactly the same manner as in Example 1 to obtain results as shown in Table 3.

Polymerization of Propylene

Propylene was polymerized in exactly the same manner as in Example 1 to obtain results as shown in Table 4.

EXAMPLES 6–9

In each of Examples 6 through 9, a catalytic component was prepared in exactly the same manner as in Example 1 with the exception of that the ethyl benzoate which was used as an electron donor compound in Example 1 was replaced with compounds shown in Table 5 in Example 6-9.

Polymerization of Ethylene

Ethylene was polymerized in exactly the same manner as in Example 1 to obtain results as shown in Table 6.

Polymerization of Propylene

Propylene was polymerized in exactly the same manner as in Example 1 with the exception of that the quantity of the polymerizing catalyst was varied as shown in Table 5. The results of polymerization were as shown in Table 5.

EXAMPLES 10 and 11

In each of Examples 10 and 11, a catalytic component was prepared in exactly the same manner as in Example 1. Ethylene was polymerized in exactly the same manner as in Example 1 with the exception of that the polymerization time was varied as shown in Table 7. The results of polymerization were also as shown in Table 7.

TABLE 1

| Example No. and comparison example No. | Titanium content (wt %) | Polymerizing activity g-PE/g-catalyst | (Ethylene) g-PE/mmol Ti-hr-atm | $\rho B$ g-PE/ml |
|---|---|---|---|---|
| Example 1 | 3.1 | 12,750 | 1,970 | 0.40 |
| Comparison Example 1 | — | 730 | — | — |
| Comparison Example 2 | 2.8 | 6,079 | 1,040 | 0.34 |
| Example 2 | 3.2 | 13,200 | 1,976 | 0.40 |
| Example 3 | 3.1 | 11,840 | 1,829 | 0.41 |

TABLE 2

| Example No. and comparison example No. | Polymerizing activity g-PP/g-catalyst | (Propylene) g-PP/g-catalyst hr-atm | H.I. (%) | $\rho B$ g-PP/ml |
|---|---|---|---|---|
| Example 1 | 27,450 | 361 | 94.2 | 0.42 |
| Comparison Example 1 | 425 | 5.6 | — | — |
| Comparison | 15,800 | 208 | 90.3 | 0.35 |

TABLE 2-continued

| Example No. and comparison example No. | Polymerizing activity g-PP/ g-catalyst | (Propylene) g-PP/g-catalyst hr-atm | H.I. (%) | ρB g-PP/ml |
|---|---|---|---|---|
| Example 2 | | | | |
| Example 2 | 28,000 | 368 | 93.8 | 0.41 |
| Example 3 | 25,525 | 336 | 93.9 | 0.42 |

TABLE 3

| Example No. | Phenol compound Name of compound | Quantity used (g) | Polymerizing activity g-PE/ g-catalyst | g-PE/mmol Ti-hr-atm | ρB g-PE/ml |
|---|---|---|---|---|---|
| Example 4 | Phenol | 3.8 | 11,960 | 1,910 | 0.39 |
| Example 5 | Resorcin | 2.0 | 12,107 | 1,871 | 0.38 |

TABLE 4

| Example No. | Polymerizing activity g-PP/g-catalyst | (Propylene) g-PP/ g-catalyst hr-atm | H.I. wt % | ρB g-PP/ml |
|---|---|---|---|---|
| Example 4 | 25,840 | 340 | 93.8 | 0.39 |
| Example 5 | 25,900 | 341 | 93.6 | 0.39 |

TABLE 5

| Example No. | Electron donor compound Name of compound | Qty used (ml) | Polymerizing activity g-PP/g-catalyst | g-PP/g-catalyst hr-atm (propylene) | H.I. wt % | ρB g-PP/ml | Catalyst compound (mg) | Polymerizing catalyst triethyl aluminum (ml) | diethyl aluminum chloride (ml) | p-anisic acid ethyl (ml) |
|---|---|---|---|---|---|---|---|---|---|---|
| 6 | p-toluic acid ethyl | 2.5 | 27,436 | 361 | 93.9 | 0.40 | 40 | 0.5 | 0.2 | 0.13 |
| 7 | p-anisic acid ethyl | 6.0 | 25,764 | 339 | 94.0 | 0.42 | 40 | 0.3 | 0.1 | 0.15 |
| 8 | n-butyl ether | 21.0 | 27,816 | 366 | 93.6 | 0.40 | 40 | 0.8 | 0.3 | 0.16 |
| 9 | n-octyl ether | 80.0 | 26,980 | 355 | 93.7 | 0.40 | 40 | 0.3 | 0.2 | 0.14 |

TABLE 6

| Example No. | Polymerizing activity g-PE/g-catalyst | g-PE/mmol Ti-hr-atm | ρB g-PE/ml |
|---|---|---|---|
| 6 | 12,559 | 1,880 | 0.37 |
| 7 | 11,186 | 1,786 | 0.39 |
| 8 | 12,676 | 1,840 | 0.36 |
| 9 | 12,159 | 1,820 | 0.36 |

TABLE 7

| Example No. | Polymerization time (hr) | Polymerizing activity g-PE/ g-catalyst | g-PE-mmol Ti-hr-atm | ρB g-PE/ml |
|---|---|---|---|---|
| 10 | 1 | 7,068 | 2,184 | 0.40 |
| 11 | 4 | 24,942 | 1,927 | 0.39 |

What is claimed is:

1. A catalytic component for polymerization of an α-olefin, prepared through steps including:
   (a) a step in which an organo-magnesium compound expressed by the generic formula of RMgX (wherein R represents a hydrocarbon group having 1 to 20 carbon atoms and X either a halogen atom or a hydrocarbon group having 1 to 20 carbon atoms) is allowed to react with carbon tetrahalide in the presence of an electron donor compound to obtain a solid product, at a temperature between −50° C. and 100° C.;
   (b) a step in which said solid product is reacted with phenols at a temperature between 90° and 180° C.; and
   (c) a step in which said phenol solid product of step (b) is reacted with at least 0.01 mol of a halogenated titanium compound per mol of the magnesium contained in the product of step (b), at a temperature between room temperature and 150° C.

* * * * *